Patented Dec. 25, 1951

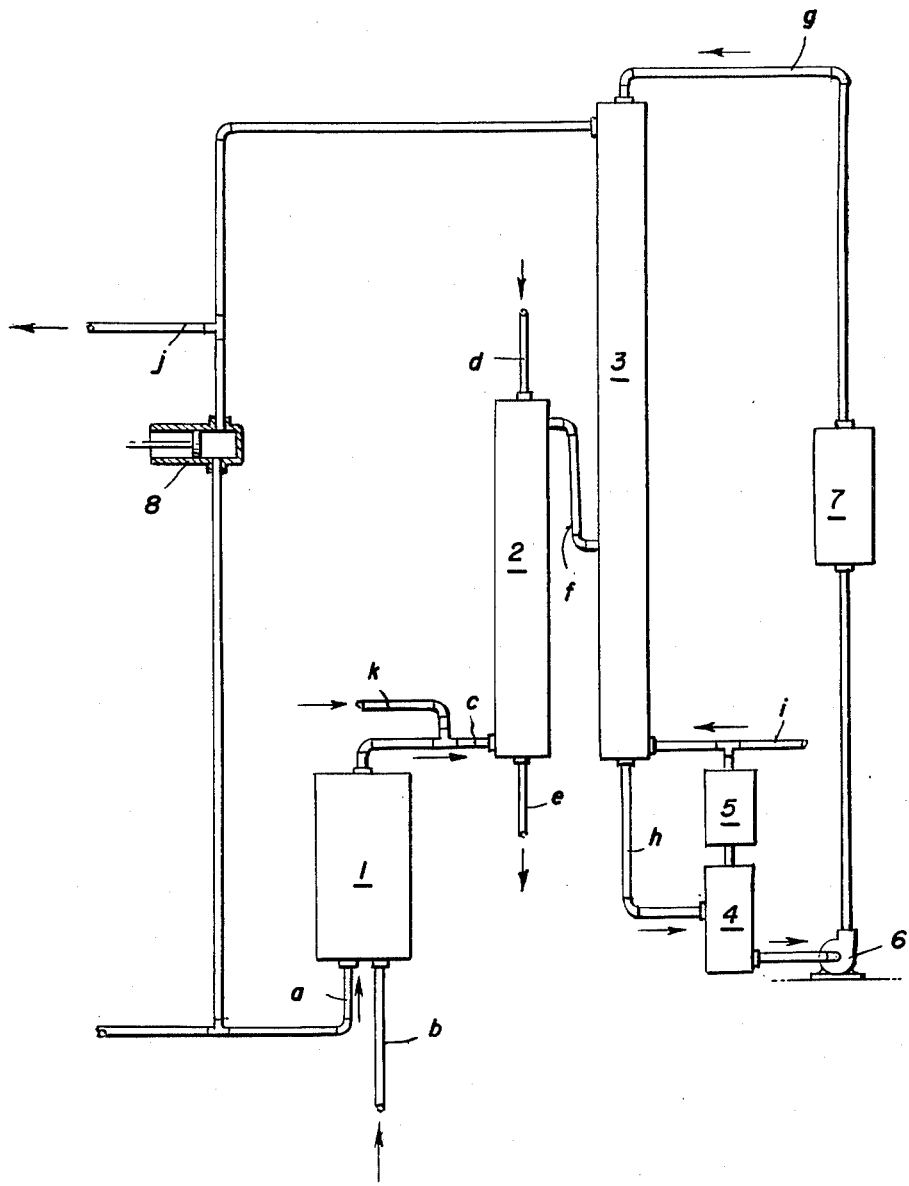

2,579,638

UNITED STATES PATENT OFFICE.

2,579,638

PRODUCTION OF ACRYLIC NITRILE

Jean-Paul Zwilling, Henri Bassoli, and Camille Granger, Salindres, France, assignors to Pechiney-Compagnie de Produits Chimiques et Electrometallurgiques, a corporation of France Application January 9, 1950, Serial No. 137,512
In France January 12, 1949

2 Claims. (Cl. 260—465.3)

This invention relates to the production of acrylicnitrile, and provides an improvement in the continuous synthesis of acrylicnitrile by the procedure comprising simultaneously passing acetylene and hydrocyanic acid through a fluid catalyst comprising an aqueous solution of a cuprous halogenide and alkali halogenides.

The improvement of this invention constitutes an important advance from a commercial standpoint inasmuch as it greatly improves the acrylicnitrile yield on the basis of the acetylene starting material used and yields a product acrylicnitrile of sufficiently pure grade to be directly usable in the production of polymers and copolymers.

In procedures of the class described as operated heretofore the commercial yields on the basis of the acetylene used were low and the resulting acrylicnitrile contained polymers of acetylene, such as vinyl-acetylene and divinylacetylene, in non negligible amounts. These substances form from acetylene in the presence of the catalyst.

This is so because the reaction between acetylene and the hydrocyanic acid when using the catalytic procedure outlined hereinabove is generally carried out with a comparatively low reaction ratio of acetylene to hydrocyanic acid. This requires that the excess acetylene be recycled back to the reactor apparatus. The recycled gas contains vinylacetylene which in the presence of the catalyst reacts with the acetylene to form divinylacetylene which is carried over into the product acrylicnitrile. To prevent a build-up of the vinylacetylene content in the gas flow, and restrict the amount of divinylacetylene formed, it is found necessary to make a continual and important drain of gas from the acetylene flow circuit, thus correspondingly reducing the yield on the basis of the acetylene.

The presence of divinylacetylene is especially objectionable, for the following reasons:

(1) It is difficult to separate it from the acrylicnitrile by distillation, because of the existence of an acrylicnitrile-divinylacetylene azeotrope, having a minimum boil point of 75.3° C. at 760 mm. Hg.

(2) Even when the amount of divinylacetylene in the acrylicnitrile is low, it objectionably affects the physical properties of the polymer and copolymer products eventually prepared therefrom To eliminate the divinylacetylene content from the acrylicnitrile, it has been suggested to subject the impure product to partial halogenation, followed by distillation, or to a systematic waterextraction step, associated with a distillation step.

Such methods however are expensive and uncertain, because of the danger of a spontaneous polymerization of the acrylicnitrile.

It has also been attempted to reduce the divinylacetylene content in the acrylicnitrile by eliminating the vinylacetylene from the recycled gas flow, through condensing the vinylacetylene at temperatures in the range of from —50° C. to —80° C. In such cases however the moisture content in said gases quickly causes icing of the condenser, and it becomes necessary to provide means for drying the gases and a set of two coolers adapted for alternate use have also to be used. Provisions have further to be made for reheating the gas flow prior to its entry into the catalyst solution, as where the gas is cold, salt crystals are found to occur which clog the acetylene intake connection. This method cannot accordingly be contemplated for commercial use to eliminate small amounts of vinylacetylene, as it is too expensive.

It has further been proposed, in the synthesis of vinylacetylene from acetylene, to separate the vinylacetylene from the acetylene by selective dissolution in solvents selected from among the class of solvents in which vinylacetylene has greater solubility than acetylene. In practice however, great difficulties are encountered when it is attempted to separate acetylene from vinylacetylene by means of a solvent, in mixtures obtained after having treated with water the gas mixture formed in the synthesis of acrylicnitrile from acetylene and hydrocyanic acid. Because of the relatively low vinylacetylene content in said gases (about 2 to 10% by volume) it is necessary to use large-sized apparatus, and large amounts of solvent, making the process expensive. Moreover, when washing the gases with a solvent, a solution is obtained in which the acetylene and vinylacetylene contents are such as to produce a stable equilibrium with the mixture being treated, and substantial losses are incurred because of the amounts of acetylene carried over with the vinylacetylene. Moreover the vinylacetylene is not pure enough to be usable as a starting material in subsequent operations.

We have found, according to this invention, that vinylacetylene may advantageously be separated from the acetylene by rectifying the acetylene-rich gas mixture containing vinylacetylene in the presence of a counter-current flow of a substantially non-volatile solvent in which the liquid vinylacetylene is miscible in all proportions, such as gas oil, mineral oils, aniline, and the like, and by operating at a temperature approaching the boiling point of vinylacetylene.

Preferably the solvent such as gas oil is saturated with sulfur in order to prevent polymerization of the vinylacetylene. Such a polymerization if it occurred would be objectionable in the first place because of the losses in vinylacetylene which it would entail and in the second place because of the trouble caused by the settling of the insoluble polymer in the circuit.

In practice, the procedure is preferably carried out within a temperature range of from 0 to 10° C.

The column in which the mixed gas-and-vapour effluent from the reactor at an outlet temperature range of from 70° C. to 100° C. are washed, is preferably fed with water at a temperature slightly less than the operating temperature of the rectifying column for rectifying the acetylene-vinylacetylene mixture in the presence of a solvent for the latter, in order to avoid water condensation in said column.

It is desirable to introduce the initial gas and vapor mixture into the scrubbing column without preliminary cooling, or even to inject steam thereinto, so that the aqueous acrylicnitrile solution should flow out from the base of the scrubbing column at a temperature in the range of from 20° C. to 40° C. and should accordingly be practically free of vinylacetylene.

The height of the extraction rectifying column and the height at which the mixed acetylene and vinylacetylene are introduced thereinto will depend on the nature of the solvent used (ratio between the vapor tensions of the acetylene and the vinylacetylene dissolved in said solvent) and on the concentration of the gases to be purified.

The method of the invention may practically be carried out in the following manner:

The mixed gas and vapor reaction product from the acetylene and hydrocyanic acid reaction is directed without preliminary cooling or after superheating with steam, into the bottom of a scrubbing column provided with a water shower, in which the water-soluble, reaction products, comprising a major proportion of acrylonitrile, are extracted from the gaseous constituents. The acetylene-rich gas mixture containing vinylacetylene is then directed into an apparatus in which it is rectified in the presence of a counter-current flow of a good solvent for vinylacetylene, e. g. into a column of the type internally provided with trays or with a known type of filling to facilitate the contact between the gas and liquid constituents, and causing part of the solvent-extracted gaseous vinylacetylene to recycle back to the bottom of the apparatus. Using a column of sufficient height and with suitably-predetermined relative flow ratio between the solvents and gases, the following final set-up is obtained in the column: at the top of the column, practically vinylacetylene-free acetylene is obtained and at the bottom of the column, highly concentrated vinylacetylene which may be used without further purifying to accomplish various desired reactions. The mixture of acetylene and vinylacetylene is introduced into the rectification column at a point of the vertical extent thereof between the lower third and the middle.

Under the operative conditions described above, the dimensions required for the apparatus are far from prohibitive, and the relative weights of solvent and processed gas used per unit time are reduced to a minimum.

One exemplary embodiment of the invention will now be described in connection with the accompanying drawing diagrammatically illustrating a plant usable in carrying out the invention. It will be understood that neither the details of the drawing nor the specific conditions set forth in the example are to be considered as restricting the scope of invention.

*Example*

The acetylene and the hydrocyanic acid are added respectively at $a$ and $b$ into the reactor 1 which has a capacity of 33 litres and contains 20 litres of a water solution containing 41% cuprous chloride, 21% ammonium chloride and 0.5% hydrochloric acid. This solution is maintained at 70-75° C. The acetylene of 90% purity is added at a rate of 1660 litres per hour and the hydrocyanic acid at a rate of 182 grams per hr. The effluent gas and vapor from 1 are introduced at substantially the reactor outlet temperature into the base of a scrubber column 2 as at $c$. At the top of this column, as shown at $d$, water at 2° C. is added at a rate so adjusted that the effluent solution from $e$ at the base of the column is a solution containing about 2% acrylicnitrile. This solution is at a temperature of about 30° C. The residual gas mixture rich in acetylene content and containing vinylacetylene, flows out of the column 2 at 5° C. and enters as at $f$ into the midpoint of the column 3, 4 meters in height and 0.14 m. in diameter, filled with Raschig rings 12 by 12 mm. in size. The gas oil, preliminarily saturated with sulfur is introduced as at $g$ into the top of the column 3 at a rate of 50 litres per hr.

The vinylacetylene solution flowing out of the column 3 at $h$ is de-gassed by application of heat to a temperature of 140-150° C. in the apparatus 4. The vinylacetylene is cooled by passing through a cooler 5. Half the amount of vinylacetylene so obtained is recycled into the bottom of column 3. The remainder is extracted as at $i$ and provides a valuable by-product. The solvent flowing out at the base of the apparatus 4 is recycled to the top of column 3 through the pump 6 and cooler 7 which reduces its temperature down to 4° C.

The acetylene evolved at the top of column 3 is recycled to the reactor through recycling pump 8 and has added to it a volume of fresh acetylene equal to the sum total of the volume of reacted acetylene plus the comparatively low amount which it is necessary to drain off in order to eliminate the inert gas constituents brought in by the acetylene. This drain is effected at $j$. If necessary steam may be added at the same time as the reaction mixture flowing from the catalyst through the conduit $k$.

The advantages of the method of the invention will be clearly apparent from a comparison of the results obtained thereby with those obtained in the same apparatus and with the same catalyst but in the absence of solvent treatment.

For a volume flow ratio of gas oil at 4° C. equal to 3/100 that of the processed gases, there is obtained by continual distillation of the effluent solution from apparatus 2, 350 g./hr. acrylonitrile having a composition:

| | Per cent by weight |
|---|---|
| Acrylicnitrile | 80.5 |
| Hydrocyanic acid | 2 |
| Ethanal | 10.5 |
| Divinylacetylene | 0.16 |

The rate of gas product drained off is so adjusted as to maintain the inert constituent content in the acetylene recycled into the reactor at about 10%. The amount of vinylacetylene contained in the acetylene is so small as to be non measurable.

The vinylacetylene separated is about 90% pure.

The calculated yields in terms of the ratio of moles product to the moles used, in a 24 hours run, are as follows:

| | Per cent |
|---|---|
| Yield in acrylicnitrile on basis of HCN | 79 |
| Yield of acrylicnitrile on basis of $C_2H_2$ | 51 |
| Yield in vinylacetylene on basis of $C_2H_2$ | 12.6 |

When not using the units 3, 4, 5, 6 and 7, there is obtained, by continuous distillation of the effluent solution from unit 2, 350 grams per hr. crude acrylonitrile containing by weight:

| | Per cent |
|---|---|
| Acrylicnitrile | 80.5 |
| Hydrocyanic acid | 2 |
| Ethanal | 10.5 |
| Divinylacetylene | 1.1 |
| Vinylacetylene | 0.2 |

The gas flowing into the reactor has an average composition as follows:

| | |
|---|---|
| Acetylene | 84.7 per cent by volume |
| Vinylacetylene | 10.0 |
| Inert const | 5.3 (100 complement) |

The rate is adjusted to maintain the title of the gas flow in the circuit constant at 10% of the vinylacetylene.

The calculated yields, in similar terms as in the foregoing example for a 24 hour run are as follows:

| | Per cent |
|---|---|
| Yield in acrylicnitrile on basis of HCN | 78 |
| Yield in acrylicnitrile on basis of $C_2H_2$ | 38.4 |

What we claim is:

1. In a process for obtaining acrylic nitrile from the reaction of acetylene with hydrocyanic acid in the presence of an aqueous solution of a cuprous salt followed by water washing of the residual gases of reaction, that improvement, which comprises introducing the mixture of reaction vapors containing acrylic nitrile, acetylene, vinylacetylene and divinylacetylene with steam at a temperature between 70–100° C. at the base of a rectifying column fed at the top with wash water, the flow and temperature of the wash water at the top of said column and the mixture of vapors and steam at the bottom of the column being adjusted so that a water solution of acrylic nitrile flows out of the base of the column at a temperature between about 20 and 40° C., said solution being practically free of acetylene, vinylacetylene and divinylacetylene and rectifying the acetylene, vinylacetylene, and divinylacetylene residual gas mixture obtained at the top of the rectifying column in the presence of a counter flowing mineral oil solvent for vinylacetylene, said mineral oil having a boiling point between 150 and 300° C. and which is saturated with sulphur, the temperature of the mineral oil solvent for vinylacetylene being maintained near the boiling point of vinylacetylene whereby substantially pure acetylene free from vinylacetylenes, is obtained at the top of the rectifying column and a concentrated solution of vinylacetylene is obtained at the bottom of the rectifying column.

2. A process as in claim 1 in which the purified acetylene from the top of the rectifying column is recycled for the synthesis of acrylonitrile in a continuous process.

JEAN-PAUL ZWILLING.
HENRI BASSOLI.
CAMILLE GRANGER.

REFERENCES CITED

The following references are of record in the file of this patent:

UNITED STATES PATENTS

| Number | Name | Date |
|---|---|---|
| 2,324,854 | Kurtz et al. | July 20, 1943 |
| 2,385,327 | Bradley et al. | Sept. 25, 1945 |
| 2,385,470 | Salley et al. | Sept. 25, 1945 |
| 2,417,635 | Davis | Mar. 18, 1947 |
| 2,486,659 | Kurtz | Nov. 1, 1949 |